Patented Apr. 15, 1952

2,592,621

UNITED STATES PATENT OFFICE 2,592,621

ETHYLXANTHOYLTHIOXY-DIPIPERIDYL-PHOSPHINE SULFIDE

Henry Tolkmith, Midland, Mich., assignor to The Dow Chemical Company, Midland, Mich., a corporation of Delaware No Drawing. Application December 30, 1950, Serial No. 203,779

1 Claim. (Cl. 260—293.4)

This invention is directed to ethylxanthoyl-thioxy-dipiperidyl-phosphine sulfide of the formula

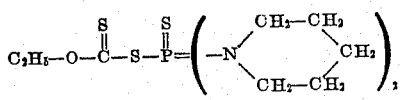

This compound is a viscous oil, somewhat soluble in many organic solvents and substantially insoluble in water. It is of value as an intermediate for the preparation of more complex phosphorus derivatives and as a constituent of parasiticide compositions.

The new compound may be prepared by reacting two molecular proportions of piperidine with one molecular proportion of S-(ethylxanthoyl) dithiophosphoric dichloride of the formula

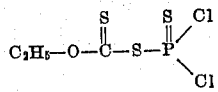

in an inert organic solvent such as benzene or diethyl ether. The reaction is carried out in the presence of a hydrogen chloride acceptor, which conveniently can be an excess of the piperidine reactant.

In carrying out the reaction, the piperidine is added portionwise with stirring to the S-(ethylxanthoyl) dithiophosphoric dichloride dispersed in the solvent and the resulting mixture heated for a period of time at a temperature of from 35° to 80° C. to complete the reaction. The reaction takes place at temperatures of from 20° to 80° C. and at a rate which varies directly with the employed temperature. The reaction is somewhat exothermic, temperature being controlled by regulation of the rate of contacting the reactants as well as by the addition and subtraction of heat, if required. Since the product has a tendency to decompose at temperatures in excess of 80° C., reaction temperatures substantially in excess of 80° C. for any appreciable period of time should be avoided. Upon completion of the reaction, the mixture may be filtered and the filtrate distilled under reduced pressure at gradually increasing temperatures up to a temperature of 80° C. to separate low boiling constituents and to obtain as a residue the desired ethylxanthoylthioxy-dipiperidyl-phosphine sulfide.

The S-(ethylxanthoyl) dithiophosphoric dichloride employed as a starting material in the above-described method may be prepared by reacting at least two molecular proportions of phosphorus thiochloride (PSCl$_3$) with one molecular proportion of sodium ethylxanthate in an inert organic solvent such as benzene. In carrying out the reaction, the sodium ethylxanthate and phosphorus thiochloride are dispersed in the solvent and the resulting mixture heated for a period of time at a temperature of from 40° to 80° C. To avoid decomposition, temperatures substantially in excess of 80° C. should not be employed. Upon completion of the reaction, the mixture may be filtered and the filtrate concentrated by distillation under reduced pressure to a temperature up to 80° C. to obtain the desired product as a residue. S-(ethylxanthoyl) dithiophosphoric dichloride is a viscous oil having a density of 1.451 at 21° C. This compound and the described method for its preparation are disclosed in my copending application Serial No. 203,768, filed concurrently herewith.

In a representative preparation, 39.6 grams (0.466 mole) of piperidine was added proportionwise with stirring and cooling to 28.1 grams (0.11 mole) of S-(ethylxanthoyl) dithiophosphoric dichloride dispersed in 600 milliliters of diethyl ether and the resulting mixture heated for 4 hours at the boiling temperature and under reflux to complete the reaction. At the end of this period the mixture was filtered and the filtrate concentrated by distillation under reduced pressure to a temperature up to 80° C. to obtain as a residue an ethylxanthoylthioxy - dipiperidyl - phosphine sulfide product. The latter was a viscous oil having a density of 1.1593 at 20° C.

I claim:

Ethylxanthoylthioxy - dipiperidyl - phosphine sulfide.

HENRY TOLKMITH.

REFERENCES CITED

The following references are of record in the file of this patent:

UNITED STATES PATENTS

| Number | Name | Date |
| --- | --- | --- |
| 2,354,536 | Nelson | July 25, 1944 |

OTHER REFERENCES

Richter, Ber. Deut. Chem., vol. 49, 1026–1029 (1916).